US010495052B2

United States Patent
Alm et al.

(10) Patent No.: US 10,495,052 B2
(45) Date of Patent: Dec. 3, 2019

(54) WAVE ENERGY CONVERTER WITH MOORING SYSTEM COMPRISING BUOYANT ELEMENTS

(71) Applicant: W4P WAVES4POWER AB, Vastra Frolunda (SE)

(72) Inventors: Filip Alm, Bohus (SE); Lennart Claesson, Angered (SE)

(73) Assignee: W4P Waves4Power AB, Västra Frölunda (SE)

( * ) Notice: Subject to any disclaimer, the term of this patent is extended or adjusted under 35 U.S.C. 154(b) by 46 days.

(21) Appl. No.: 15/563,006

(22) PCT Filed: Mar. 31, 2016

(86) PCT No.: PCT/SE2016/000016
§ 371 (c)(1),
(2) Date: Sep. 29, 2017

(87) PCT Pub. No.: WO2016/159856
PCT Pub. Date: Oct. 6, 2016

(65) Prior Publication Data
US 2018/0363621 A1    Dec. 20, 2018

(30) Foreign Application Priority Data

Apr. 2, 2015  (SE) ........................................ 1530044
May 5, 2015  (SE) ........................................ 1530060

(51) Int. Cl.
*F03B 13/18*  (2006.01)
*B63B 21/50*  (2006.01)
(Continued)

(52) U.S. Cl.
CPC .......... *F03B 13/1875* (2013.01); *B63B 21/50* (2013.01); *B63B 35/44* (2013.01);
(Continued)

(58) Field of Classification Search
CPC .... F03B 13/1885; F03B 13/189; F03B 13/20; F03B 13/12; F03B 13/14; F03B 13/16;
(Continued)

(56) References Cited

U.S. PATENT DOCUMENTS 2,986,888 A   6/1961  Borrmann
3,703,151 A   11/1972 Clement
(Continued)

FOREIGN PATENT DOCUMENTS

GB     1 492 427 A    11/1977
WO     95/15277 A1     6/1995
(Continued)

OTHER PUBLICATIONS

International Search Report, dated Jul. 8, 2016, from corresponding PCT application No. PCT/SE2016/000016.

*Primary Examiner* — Mark A Laurenzi
*Assistant Examiner* — Mickey H France
(74) *Attorney, Agent, or Firm* — Young & Thompson

(57) ABSTRACT

A wave energy converter includes a buoyant body and an acceleration tube attached thereto forming a working cylinder. Upper and lower openings in the acceleration tube allow water flow between the working cylinder and the water in which the acceleration tube is at least partially submerged. A working piston is reciprocable in the working cylinder and an energy converting device collects energy from the movements of the working piston relative to the buoyant body. A mooring system maintains the wave energy converter within a desired anchoring area and includes at least a first fastening device mounted on the buoyant body for attachment of a first mooring line to the buoyant body and a second fastening device mounted on the buoyant body for attachment of a second mooring line to the buoyant body. The mooring lines
(Continued)

include first and second line sections, respectively, and at least one buoyant element attached therebetween.

20 Claims, 2 Drawing Sheets

(51) Int. Cl.
*B63B 35/44* (2006.01)
*F03B 13/14* (2006.01)

(52) U.S. Cl.
CPC .... *F03B 13/142* (2013.01); *B63B 2035/4466* (2013.01); *F05B 2240/917* (2013.01); *F05B 2240/93* (2013.01); *Y02E 10/32* (2013.01); *Y02E 10/38* (2013.01)

(58) Field of Classification Search
CPC .... F03B 13/1875; F03B 13/142; B63B 35/44; B63B 21/50; B63B 2035/4466; F05B 2240/917; F05B 2240/93; Y02E 10/38; Y02E 10/32

USPC .................................................. 290/42, 53
See application file for complete search history.

(56) References Cited

U.S. PATENT DOCUMENTS

| 4,631,921 | A | 12/1986 | Underfelt |
| 2010/0107627 | A1* | 5/2010 | Morgan ................. B63B 35/44 60/495 |
| 2014/0126865 | A1* | 5/2014 | Chang ................. H01B 7/2825 385/101 |
| 2014/0145442 | A1 | 5/2014 | Hart |

FOREIGN PATENT DOCUMENTS

| WO | 97/41349 | A1 | 11/1997 |
| WO | 2007/106323 | A2 | 9/2007 |

* cited by examiner

WAVE ENERGY CONVERTER WITH MOORING SYSTEM COMPRISING BUOYANT ELEMENTS

TECHNICAL FIELD

The present invention relates to a wave energy converter comprising a buoyant body, an acceleration tube dependent from and attached to the buoyant body and defining a working cylinder between an upper and a lower end thereof, upper and lower openings in the acceleration tube, a working piston reciprocable in the working cylinder, an energy conversion assembly comprising at least one energy collecting device collecting energy from the movements of the working piston relative to the buoyant body resulting from wave movements, and a mooring system adapted to maintain the wave energy converter within a desired anchoring area and comprising at least a first fastening device mounted on the buoyant body for attachment of a first mooring line to the buoyant body and at least a second fastening device mounted on the buoyant body for attachment of a second mooring line to the buoyant body.

BACKGROUND OF THE INVENTION

Wave movements in oceans and large lakes is an important source of energy which can be utilized by harvesting energy from the waves by means of wave power assemblies, also called wave energy converters, which are positioned or anchored at locations with suitable wave conditions.

A number of different types of wave energy converters for harvesting and converting wave energy into electrical power are previously known. An example are so-called linear generators, which, by means of a rope or other connecting means, can convert vertical movement of a buoyant body caused by wave movements into a reciprocating movement of a generator coil or rotor of a linear generator that is anchored to the sea or lake bed. The reciprocating movement of the generator coil/rotor, in its turn, produces electrical current in the windings of an adjacent stator of the linear generator anchored to the bed.

Another previously known type of wave energy converter comprises a wave energy collecting buoyant body with an energy collection and conversion system, which may be placed on the sea bed. The buoyant body is connected to a winch via a winch cable. The winch and the winch cable connects the buoyant body to a reference body below the water surface, such as an anchor platform beneath the water surface, an anchor at the sea bed, or a different anchoring device. As the wave forces causes the buoyant body to move in the longitudinal direction of the winch cable, the winch is forced to rotate, whereupon the rotary motion of the winch axle produced can be converted into electricity by means of an energy conversion system.

Thus, in the two above-mentioned types of previously known wave energy converters, the upward and downward movements of the buoyant body resulting from wave movements produces a reciprocating movement in the longitudinal direction of a mooring line, cable or other connecting means, which connects the buoyant body to an anchor or other fixed anchoring point below the water surface. In order to obtain a high efficiency of these wave energy converters, it is essential that as large a fraction as possible of the motion of the buoyant body can be transformed into reciprocating motion in the longitudinal direction of the connecting means, which can be collected via the linear generator and winch, respectively, and be converted into electricity.

A completely different type of previously known wave energy converter is instead based on relative movement between, on the one hand, a buoyant body and a thereto attached so-called acceleration tube, and, on the other hand, a working piston reciprocable in the acceleration tube, wherein the relative movement is caused by wave movements in the body of water where the wave energy converter is anchored by means of one or several mooring lines for harvesting wave energy. The movement of the working piston can be used for driving for example a pump assembly, such as a double acting hydraulic pump or a hose pump, a hydraulic motor and/or a hydraulic turbine of an energy conversion system, which is disposed inside or adjacent to the buoyant body for producing electricity which can be transferred to an energy storage or electrical grid.

In the above-mentioned type of wave energy converter having an acceleration tube, it is thus inessential for the efficiency whether as large a fraction as possible of the motion of the buoyant body can be transformed into reciprocating motion in the longitudinal direction of the mooring line or not. As a matter of fact, such a wave energy converter having an acceleration tube can, in principle, operate without any mooring line at all, although this is not recommendable, both for safety reasons and since it is, of course, desirable to be capable of maintaining the wave energy converter at a desired anchoring position, where the wave conditions are as good as possible for wave energy harvesting.

The previously known mooring systems for wave energy converters having acceleration tubes have generally comprised fixing eyes, fixing cleats and/or shackles for mooring lines, wherein the mooring lines, in conjunction with anchors laid out, are intended to maintain the wave energy converter horizontally at a selected anchoring position, while the wave energy converter is still allowed to pivot vertically.

In practical trials it has been found that the previously used mooring systems of wave energy converters having acceleration tubes are associated with problems that may influence the durability, function, operational reliability and efficiency of such wave energy converters in a negative way. One problem with the previously known mooring systems of wave energy converters having acceleration tubes is that they often fail to maintain the wave energy converter within a selected, desired anchoring area during varying wind and current conditions and water levels, which may result in an inferior efficiency of the wave energy converter if it drifts away from a selected anchoring position with optimum wave conditions or, in the worst case, even result in breakdowns if the wave energy converter gets to close to a surf zone due to strong winds and/or variations in water level.

Another problem with the previously known mooring systems is that they do not keep the mooring lines taut when big waves or swells are passing the wave energy converter, which may cause a mooring line to make a knot onto itself, or make a loop around, and possibly damage the buoyant body of the wave energy converter when the mooring line gets slack in a deep wave trough, which may lead to operational failures, increased need of maintenance and reduced efficiency of the wave energy converter.

Yet another problem with the previously used mooring systems of wave energy converters having acceleration tubes is that their fastening devices for mooring lines on the buoyant body have a design which permits slippage between the mooring lines and the fastening devices, e.g. between a mooring line and an eye, a yoke, a fairlead and/or a hawse or shackle, as the buoyant body is thrown about by wave movements, which results in an increased need of maintenance work for replacing mooring lines, and which, in the worst possible case, can result in line failures and risk of damage to, or loss of the wave energy converter.

Additional problems solved by the present invention will become evident from the following description.

SUMMARY OF THE INVENTION

A first object of the present invention is to provide a wave energy converter having an acceleration tube and an improved mooring system, with better chances of maintaining the wave energy converter within a selected, desired anchoring area, and which furthermore considerably reduces the risk that a mooring line of the mooring system becomes slack and makes a knot onto itself, or makes a loop around, and possibly damages the buoyant body of the wave energy converter.

This first object is achieved by means of a wave energy converter according to claim 1, comprising: a buoyant body; an acceleration tube dependent from and attached to the buoyant body and having an upper end adjacent to the buoyant body and a lower end at a distance from the buoyant body, wherein a portion of the acceleration tube defines a working cylinder between the upper end and the lower end; upper and lower openings in the acceleration tube for allowing a substantially unimpeded flow of water between the working cylinder and a body of water in which the acceleration tube is at least partially submerged when the wave energy converter operates as a result of wave movements; a working piston reciprocable in the working cylinder; an energy conversion assembly comprising at least one energy collecting device collecting energy from the movements of the working piston relative to the buoyant body resulting from said wave movements; and a mooring system adapted to maintain the wave energy converter within a desired anchoring area and comprising at least a first fastening device mounted on the buoyant body for attachment of a first mooring line to the buoyant body and at least a second fastening device mounted on the buoyant body for attachment of a second mooring line to the buoyant body, wherein the first mooring line comprises a first line section for attachment to the first fastening device and a second line section for attachment to a first anchor placed or intended to be placed at a first anchor position located outside a first side of the desired anchoring area, wherein the second mooring line comprises a first line section for attachment to the second fastening device and a second line section for attachment to a second anchor placed or intended to be placed at a second anchor position located outside a second side of the desired anchoring area, wherein at least one of the mooring lines comprises at least one buoyant element attached between the first line section and the second line section so as to, after positioning of said anchors, attachment of said second line sections to said anchors, pretensioning of each mooring line provided with a buoyant element and attachment of said first line sections to the buoyant body, allow that each mooring line provided with a buoyant element, as a result of inherent buoyancy of said buoyant element, will exhibit an angle dependent on said pretensioning between said first line section and said second line section, which enables each mooring line provided with a buoyant element to be kept taut by decrease of the angle and resulting lengthening of the effective length of the mooring line and by increase of the angle and resulting shortening of the effective length of the mooring line, respectively, when the wave energy converter operates as a result of said wave movements, and wherein the lengths of the first and second line section, respectively, and the buoyancy of the buoyant element of each mooring line, and the pretensioning of the respective mooring lines are adapted to ensure that each buoyant element is located under the water surface at mean water level.

Thanks to the fact that the mooring lines provided with buoyant elements are pretensioned, they will maintain the buoyant body of the wave energy converter in the selected, desired anchoring area in a more stable and stationary manner than what non-pretensioned lines would have been capable of, which is advantageous since the buoyant body is thereby maintained at the selected optimum position for efficient wave energy harvesting, and since the risk of breakdowns due to the fact that the wave energy converter accidentally gets into a surf zone is minimized. Thanks to said buoyant elements, the mooring lines provided with buoyant elements will exhibit an angle between the first line section and the second line section and be kept taut by decrease of the angle and resulting lengthening of the effective length of the mooring line and by increase of the angle and resulting shortening of the effective length of the mooring line, respectively, when the wave energy converter operates as a result of said wave movements, which considerably reduces the risk that a mooring line becomes slack in deep wave trough and makes a knot onto itself, or makes a loop around the buoyant body of the wave energy converter and possibly damages the wave energy converter.

A second object of the present invention is to provide a wave energy converter having an acceleration tube and an improved mooring system comprising at least one fastening device on the buoyant body which, if desired, enables a simple adjustment of the laid length of the mooring line relative to the water depth and which facilitates pretensioning of the mooring line, and which furthermore provides very good conditions for being able to reduce the need for inspection and maintenance work for replacing mooring lines and to reduce the risk of line failures due to wear and tear of the mooring lines.

This second object is achieved by means of a wave energy converter according to claim 3, in which at least one of the fastening devices mounted on the buoyant body comprises a winch adapted to be capable of winding up a portion of the first line section when pretensioning the mooring line and of attaching the first line section to the buoyant body.

Thanks to the provision of a fastening device comprising a winch mounted on the buoyant body, a simple adjustment of the laid length of the mooring line is enabled and the pretensioning of the mooring line is facilitated to a great extent. Thanks to the provision of such a winch, which can be provided with a rotatable drum or shaft around which at least one complete turn of the first line section extends in a smooth curve, while it is tensioned against the surface of the drum or shaft by the tension in the pretensioned mooring line and, and with a locking device, which after actuation prevents rotation of the drum of shaft and thus maintains the pretension, a very careful and almost slip-free attachment of the first line section to the buoyant body, without any sharp deflection points prone to wear, is enabled after the pretensioning by means of the winch, which provides very good conditions to increase the durability of the mooring line, and to thereby reduce the risk of the wave energy converter breaking away and becoming damaged or, in the worst case, being lost completely.

Further objects and advantages of the invention, and the features enabling these objects and advantages to be achieved, will become evident from the following description.

BRIEF DESCRIPTION OF THE DRAWINGS

In the following, the invention will be described by means of different embodiments with reference to the accompanying drawings, in which.

DESCRIPTION OF EMBODIMENTS OF THE INVENTION

Figure 1:
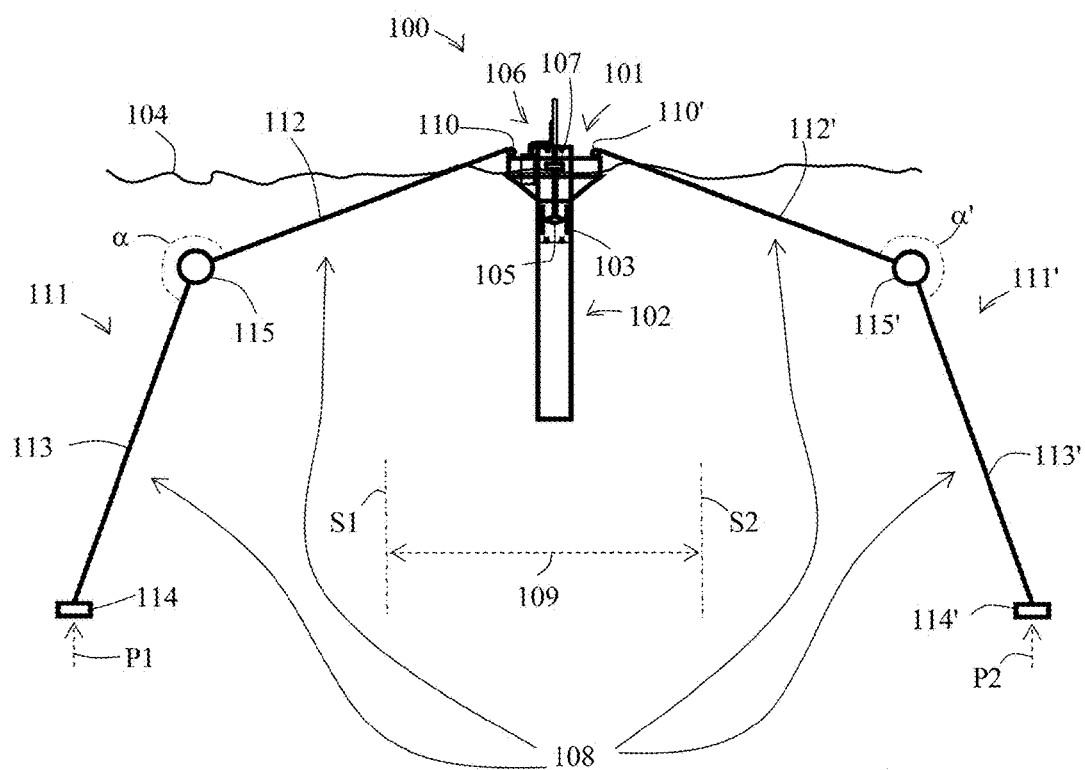
FIG. 1 is a schematic side view, partially in cross-section, of a wave energy converter according to a preferred embodiment of the invention, which is maintained within a desired anchoring area by two pretensioned mooring lines provided with buoyant elements and which each are attached to a fastening device on the buoyant body of the wave energy converter and to a laid-out anchor, respectively, while the wave energy converter operates as a result of wave movements in a body of water in which the acceleration tube of the wave energy converter is at least partially submerged.
Figure 2:
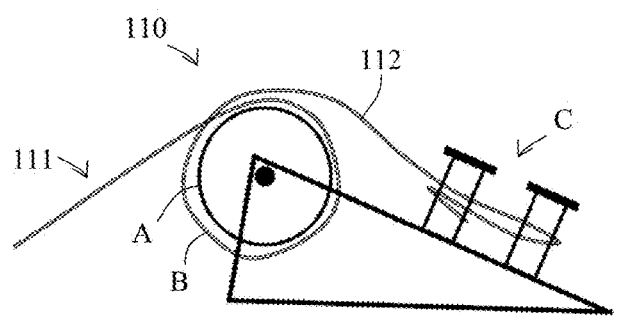
FIG. 2 shows an outline diagram of a fastening device of the wave energy converter according to the preferred embodiment, in the form a winch with bollards fixed in the vicinity of the winch.

In the following, a number of embodiments of a wave energy converter according to the invention will be described in greater detail with reference to the accompanying FIGS. 1-3.

The wave energy converter 100 comprises a buoyant body 101, which can be of any type and design suitable for the purpose. An acceleration tube 102 is dependent from and attached to the buoyant body 101 and has an upper end adjacent to the buoyant body and a lower end at a distance from the buoyant body, wherein a portion of the acceleration tube 102 defines a working cylinder 103 between the upper end and the lower end. Wave energy converters with acceleration tubes are well-known to a skilled person within the field, for example from the patent publications SE 508 307 and SE 508 308. Upper and lower openings in the acceleration tube 102 allow a substantially unimpeded flow of water between the working cylinder 103 and a body of water 104 in which the acceleration tube 102 is at least partially submerged when the wave energy converter operates as a result of wave movements. In the working cylinder 103, there is disposed a working piston 105, which is reciprocable in the working cylinder 103.

The upper and lower openings in the acceleration tube 102 can be provided in different ways, depending on the embodiment. In a particularly preferred embodiment of the wave energy converter 100, an upper opening is provided in the form of the open end at the top of the acceleration tube 102, which opens into the atmosphere above the top side of the buoyant body, whereas a lower opening is provided in the form of the open end at the bottom of the acceleration tube 102, which preferably opens approximately 20 meters below the water surface into the body of water in which the acceleration tube is partially submerged. However, it is also conceivable with embodiments of the invention where one or both of the upper and lower openings, respectively, are provided in the form of one or several suitably dimensioned holes disposed through the envelope surface of the acceleration tube at suitable positions.

The wave energy converter 100 further comprises an energy conversion assembly 106 comprising at least one energy collecting device 107 collecting energy from the movements of the working piston 105 relative to the buoyant body 101 resulting from said wave movements. The energy conversion assembly 106 with the energy collecting device 107 (or devices) can be of different shape and design in different embodiments of the wave energy converter 100 according to the invention. In one embodiment, the energy collecting device can, as indicated in FIG. 1, comprise a double-acting piston pump 107, which is disposed in the buoyant body 101 and connected to the working piston 105 via a piston rod, but could, in another embodiment (not shown in the figures), instead comprise a rack and pinion, or, in yet another embodiment (not shown), comprise a pair of so-called hose pumps, which are resiliently extendable and connected between, on the one hand opposite sides of the working piston and, on the other hand, the buoyant body and/or the acceleration tube. The wave energy converter 100 according to the present invention is, however, not limited to any particular type of acceleration tube 102 and/to any particular type of energy conversion assembly 106 or any particular type of energy collecting device 107 or devices.

It is advantageous that the wave energy converter 100 according to the invention further comprises an arrangement for so-called peak force relief to reduce the risk of the working piston 105, the energy collecting device 107 or other components of the wave energy converter 100 being damaged by the forces from excessively large wave movements. As indicated in FIG. 1, such an arrangement can advantageously be provided in that the working cylinder 103 is disposed inside the acceleration tube 102 and designed with a shorter length and smaller outer and inner diameter than the acceleration tube 102, and in that the working piston 105 is designed with an outer diameter fitting inside the inner diameter of the working cylinder 103 and adapted to have a length of stroke that is longer than the length of the working cylinder 103 and shorter than the length of the acceleration tube 102.

In embodiments where the wave energy converter 100 is provided with a suitably designed and dimensioned arrangement for peak force relief as described above, an excessively large wave crest passing the wave energy converter 100 will cause the buoyant body 101 to rise rapidly and simultaneously cause the water column inside the acceleration tube 102 to fall suddenly relative to the buoyant body 101, wherein the falling water column inside the acceleration tube 102 will push the working piston 105 to a lower extreme position outside the working cylinder 103 so that an open passage for the falling water column inside the acceleration tube 102 is formed between the smaller outer diameter of the working piston 105 and the larger inner diameter of the acceleration tube 102 below the working cylinder 103 and is kept open until the excessively large wave crest has passed. If instead an excessively large wave trough passes the wave energy converter 100, the wave trough will, in an analogous way, cause the buoyant body 101 to fall rapidly and simultaneously cause the water column inside the acceleration tube 102 to rise suddenly relative to the buoyant body 101, wherein the rising water column inside the acceleration tube 102 will push the working piston 105 to an upper extreme position outside the working cylinder 103 so that an open passage for the rising water column inside the acceleration tube 102 is formed between the smaller outer diameter of the working piston 105 and the larger inner diameter of the acceleration tube 102 above the working cylinder 103 and is kept open to let water pass through until the excessively large wave trough has passed.

The wave energy converter 100 according to the invention further comprises a mooring system 108 adapted to maintain the wave energy converter 100 within a desired anchoring area 109 and comprising at least a first fastening device 110 mounted on the buoyant body 101 for attachment of a first mooring line 111 to the buoyant body 101 and at least a second fastening device 110' mounted on the buoyant body 101 for attachment of a second mooring line 111' to the buoyant body 101. Accordingly, the mooring system of the wave energy converter according to the invention can comprise two or several mooring lines and two or several fastening devices, amongst other things depending on the size of the wave energy converter in question.

The first mooring line 111 of the mooring system 108 comprises a first line section 112 for attachment to the first fastening device 110 and a second line section 113 for attachment to a first anchor 114 placed or intended to be placed at a first anchor position P1 located outside a first side S1 of the desired anchoring area 109, whereas the second mooring line 111' comprises a first line section 112' for attachment to the second fastening device 110' and a second line section 113' for attachment to a second anchor 114' placed or intended to be placed at a second anchor position P2 located outside a second side S2 of the desired anchoring area 109.

At least one of the mooring lines 111; 111' comprises at least one buoyant element 115; 115' attached between the first line section 112; 112' and the second line section 113; 113' so as to, after positioning of said anchors 114; 114', attachment of said second line sections 113; 113' to said anchors 114; 114', pretensioning of each mooring line 111; 111' provided with a buoyant element and attachment of said first line sections 112; 112' to the buoyant body 101, allow that each mooring line 111; 111' provided with a buoyant element, as a result of inherent buoyancy of said buoyant element 115; 115', will exhibit an angle α, α' dependent on said pretensioning between said first line section 112; 112' and said second line section 113; 113', which enables each mooring line 111; 111' provided with a buoyant element to be kept taut by decrease of the angle α, α' and resulting lengthening of the effective length of the mooring line and by increase of the angle α, α' and resulting shortening of the effective length of the mooring line, respectively, when the wave energy converter 100 operates as a result of said wave movements.

By means of providing at least one, preferably at least two, of the mooring lines 111, 111' of the wave energy converter 100 with a buoyant element 115; 115' between the first 112; 112' and second line section 113; 113' and pretensioning such mooring lines 111, 111', the lines will be capable of maintaining the wave energy converter 100 in the vicinity of the optimum anchoring position in a more stable and more stationary manner than what non-pretensioned lines would have been capable of. Thanks to said buoyant elements 115; 115', the mooring lines 111, 111' will exhibit an angle α, α' between the first line section 112; 112' and the second line section 113; 113' and be kept taut by decrease of the angle and resulting lengthening of the effective length of the mooring line and by increase of the angle and resulting shortening of the effective length of the mooring line, respectively, when the wave energy converter operates as a result of said wave movements, which considerably reduces the risk of a mooring line becoming slack in deep wave trough and making a knot onto itself, or making a loop around the buoyant body of the wave energy converter and possibly damaging the wave energy converter.

In one advantageous embodiment of the invention, each mooring line 111; 111' of the wave energy converter 100 comprises at least one buoyant element 115; 115' attached between the first line section 112; 112' and the second line section 113; 113', wherein the mooring system 108 further comprises separate fastening devices 110, 110' mounted on the buoyant body 101 for attachment of each mooring line to the buoyant body 101. Such an embodiment with separate fastening devices 110, 110' enables an optimized and individual pretensioning and attachment of the respective mooring lines 111; 111' to the buoyant body 101.

In a preferred embodiment of the wave energy converter 100 according to the invention, the first line section 112; 112' of at least one of the mooring lines 111; 111' has an elastic stretch permitting a maximum lengthening thereof of no more than 5% at maximum calculated force in the mooring line (i.e. at maximum expected current and wave force in the same direction), whereas said buoyant element 115; 115' between the first line section 112; 112' and the second line section 113; 113' has a position on the mooring line 111; 111' and a buoyancy which, after positioning of said anchors 114; 114', attachment of said second line section 113; 113' to said anchor 114; 114', pretensioning of said mooring line 111; 111' and attachment of said first line section 112; 112' to the buoyant body 101, allow a maximum lengthening and shortening, respectively, of the effective length of the mooring line 111; 111' of at least 30 meters, as a result of said wave movements together with tide variations, other variations in water level and wind and current drift of the buoyant body 101. Such a comparatively low elastic stretch of the first line section 112; 112' reduces the risk of the first line section getting tangled or jamming during the attachment thereof to the fastening device 110; 110', while such a large maximum lengthening and shortening, respectively, of the effective length of the mooring line 111; 111' ensures that the mooring line can be pretensioned sufficiently and that subsequently it will be possible to keep it taut, even in spite of large tide variations, strong wind and current drift of the buoyant body 101 and height differences between wave crests and wave troughs which may amount to 15-20 meters. Such conditions are not uncommon in places suited for an efficient harvesting of wave energy.

In another advantageous embodiment of the wave energy converter 100 according to the invention, the lengths of the first 112; 112' and second 113; 113' line section, respectively, and the buoyancy of the buoyant element 115; 115' of each mooring line 111; 111', and the pretensioning of the respective mooring lines 111; 111' are adapted to ensure that each buoyant element 115; 115' is located at least 6 meters below the water surface 104 at mean water level. Such a dimensioning and pretensioning has been proven to be capable of ensuring that the buoyant elements 115; 115' remain under the water surface 104 also in large wave troughs and thereby are capable of maintaining the tension on the mooring lines 111; 111' even in such conditions.

The buoyant elements of the wave energy converter 100 according to the invention may actually be of any suitable design as long as they have a sufficient durability and buoyancy to be able to keep the mooring lines taut for a sufficiently long period of operation. In a preferred embodiment of the wave energy converter, however, each buoyant element 115; 115' comprises a hollow or porous body and an enclosing casing. By means of designing the buoyant elements as a hollow or porous body with an enclosing casing, an advantageous control of the buoyancy of the buoyant elements is made possible, for example by providing the enclosing casing with suitably disposed valves which can be opened by a diver or by means of a remotely operated vehicle to let water in and reduce the buoyancy of a buoyant element in order to relieve the tension in the second line section, for example in connection with replacing a damaged anchor, wherein the valves also can be used for expelling the water by means of pressurized air or other pressurized gas after completed replacement of anchor.

The buoyant elements 115; 115' of the mooring lines may actually be made of any suitable and sufficiently durable material, but particularly advantageously comprise a plastic material, a natural or synthetic rubber material, a foam material and/or a polymer material with substantially closed cells, wherein the buoyant elements preferably contain air or another gas.

In a particularly advantageous embodiment, the buoyant elements 115; 115 have one or several attachment means (not shown in the figures) adapted for attachment of a line-end of a first line constituting the first line section 112; 112' and for attachment of a line-end end of a separate, second line constituting the second line section 113; 113', wherein said attachment means comprise a fixing eye adapted to allow a line-end to be passed through the fixing eye and be tied, spliced or sewn into a loop around it and/or comprise at least one wheel, fixed against rotation, adapted to allow a line-end to be placed around the wheel and be tied, spliced or sewn into a loop around the wheel to attach the line-end to it. Thanks to the provision of such specially adapted attachment means in the form of fixing eyes and/or wheels fixed against rotation around which the line-ends can be fixed by tying, splicing or sewing, wear and tear of the line-ends attached to the buoyant elements 115; 115 can be minimized.

It is also conceivable with alternative embodiments within the scope of the invention, in which the first and second line sections are not separate lines, but are provided in the form of different portions of a single continuous line. Accordingly, in such an alternative embodiment, the buoyant element is attached in a suitable manner to a line portion between a first end and an opposite second end of a continuous line in order to form the first line section and the second line section.

The first line section 112; 112' of the mooring lines 111; 111 can advantageously have an outer diameter in the range of 20-80 mm and/or a maximum circumference in the range of 2.5-10 inches. By selecting suitable materials for the first line section 112; 112' and an outer diameter and/or maximum circumference in the above-mentioned ranges, a sufficient durability of the first line section 112; 112' can be obtained without having to dimension the fastening devices 110; 110' any larger than necessary.

In one advantageous embodiment of the invention, the first line section 112; 112' consists of a rope or a braided rope of one or several synthetic polymer materials. Examples of suitable synthetic polymer materials are polyester and HMPE, wherein synthetic materials with high breaking strength and E modulus, such as HMPE, are particularly advantageous since the first line section 112; 112' can thereby be made thinner and easier to handle during attachment to the buoyant body than what otherwise would be the case.

In embodiments where the first line section 112; 112' consists of a rope or braided rope of synthetic polymer material, it is particularly advantageous if at least a portion of the first line section 112; 112', located above or near the water surface 104 when the wave energy converter operates, comprises a surrounding layer of material or a surrounding coating of a UV protective material, this so as to minimize the risk of the polymer material being degraded by sun light.

In a preferred embodiment of the wave energy converter 100 according to the invention, at least one, and preferably all of the fastening devices mounted on the buoyant body 101 comprises/comprise a winch 110; 110' adapted to be capable of winding up a portion of the first line section 112; 112' of the respective mooring line when pretensioning the mooring lines 111; 111' and of attaching the first line section 112; 112' to the buoyant body 101. Fastening devices in the form of winches 110; 110' mounted on the buoyant body 101 can, if desired, enable a simple adjustment of the laid length of the mooring lines 111; 111' in relation to the water depth when positioning the wave energy converter 100, and, furthermore, facilitate the pretensioning of the mooring lines 111; 111' to a great extent. The winches on the buoyant body do not necessarily need to have an installed drive assembly, instead a suitable separate drive assembly can be connected when necessary to drive the drum, or be applied to the first line section to drive the rotation of the winch.

The winches 110; 110' of the wave energy converter 100 in the preferred embodiment are preferably adapted to be capable of winding up at least 8 meters of the first line section 112; 112' when pretensioning the mooring lines 111; 111'. Such a capacity enables a pretensioning of the mooring lines 111; 111' which is sufficient for most conditions, without having to make the winches any larger and heavier than what is absolutely necessary.

The winches 110; 110' of the wave energy converter 100 in the preferred embodiment preferably comprise a rotatable drum A or shaft (see the winch 110 in FIG. 2) around which at least one complete turn B of the first line section 112 is adapted to pass during the winding operation. In a particularly preferred embodiment of the wave energy converter 100 according to the invention, the winch 110 comprises a locking device (not shown in the figures) which, after pretensioning of the mooring line 111, is adapted to be actuatable to lock the rotation of the rotatable drum A or shaft, while at least one complete turn B of the first line section 112 still remains wound around the rotatable drum or shaft. A fastening device in the form of a winch 110 with such a locking device is very advantageous as compared to several of the previously known fastening devices used on buoyant bodies, such as fixing eyes, shackles, yokes, hawses, fairleads and the like, since the turn of line B or turns of line of the first line section 112 extending around the drum A or shaft of the winch 110 in a smooth curve, without any sharp deflection points prone to wear, will be tensioned against the surface of the drum A or shaft by the tension in the pretensioned mooring line 111, while the locking device, after actuation, prevents rotation of the drum A or shaft and thereby maintains the pretension of the mooring line 111 and the attachment thereof to the buoyant body 101.

In the previously known fastening devices on buoyant bodies of the type in question, the line usually passes through a hawse or similar element where the line direction changes some distance from the point of attachment of the line to the buoyant body, which results in that the line portion between the point of attachment and the hawse will change length when the load on the line changes and the line will slip against the hawse where the contact force is high and be seriously worn. By providing fastening devices comprising winches 110; 110' from which the first line section 112; 112' goes straight down into the body of water 104 where the buoyant body is anchored, the wave energy converter in the preferred embodiment can eliminate this specific problem. A further advantage of fastening devices comprising a winch is that a short length of line can be paid out or wound up if some local wear and tear should nevertheless occur at any point of the first line section, so that any continued wear and tear occurs on an unworn spot of the line.

In another advantageous embodiment of the wave energy converter 100 according to the invention, a bollard C or similar device (see FIG. 2) is fixed to the buoyant body 101 in the vicinity of each winch 110 to allow secure fastening of a portion of the first line section 112 which has passed through the winch during the pretensioning of the mooring line 111. Such a bollard C or similar device can be used for collecting or securing coils of the first line section wound up during length adjustment or pretensioning of the mooring line, or as an additional safety device, which still attaches the mooring line to the buoyant body in the event of a breakdown of the locking device of the winch or the winch itself. In embodiments with winches lacking the locking device described above, such a bollard or similar device can be used for securing a portion of the first line section that has been wound up, while at least one complete turn of the first line section 112 still remains wound around the still rotatable drum or shaft.

The winches of the wave energy converter according to the preferred embodiment are particularly advantageously hand powered winches 110; 110'. Such hand powered winches are advantageous, since they are compact, light and reliable and do not require any access to electricity or other power supply during positioning, maintenance, or adjustment of the wave energy converter 100.

The preferred embodiment of the invention, where the wave energy converter 100 comprises fastening devices in the form of winches 110; 110' for the mooring lines 111; 111', enables a very careful and almost slip-free attachment of the first line section 112; 112' to the buoyant body 101 after the pretensioning by means of the winches, which considerably reduces the need for inspections and maintenance and reduces the risk of the buoyant body breaking away and the wave energy converter becoming damaged, or in the worst case being lost completely.

Figure 3:
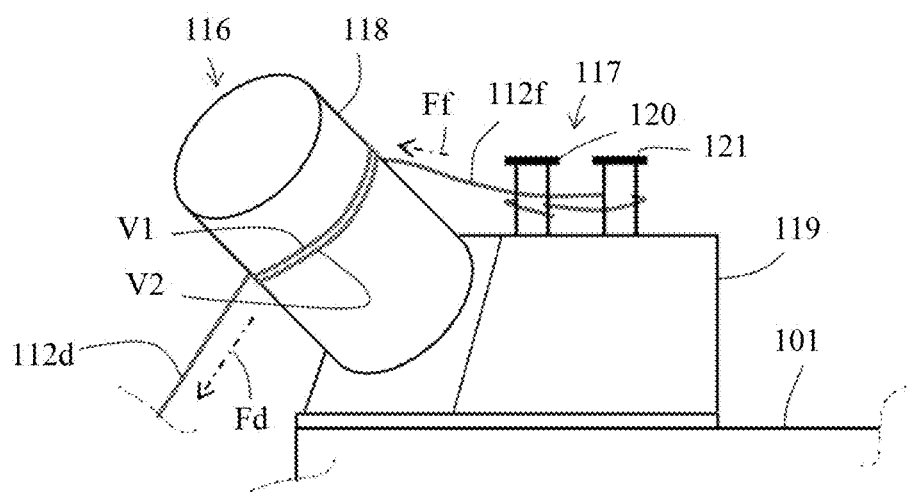
FIG. 3 shows an outline diagram of a fastening device according to an alternative embodiment, in the form of a winding device which is rotationally fixedly mounted on the buoyant body, and a securing device which is disposed on the buoyant body for interaction with the winding device.

In an advantageous alternative embodiment of the wave energy converter 100, particularly illustrated in FIG. 3, at least one of the fastening devices mounted on the buoyant body 101 comprises/comprise a winding device 116, which is rotationally fixedly mounted on the buoyant body 101, and a securing device 117, which is disposed on the buoyant body 101 for interaction with the winding device 116, and wherein the winding device 116 exhibits an outer peripheral surface 118, which is adapted for winding therearound at least two turns V1, V2 of the first line section 112, and wherein the securing device 117 is adapted for securing thereto a free part 112f of the first line section coming from the winding device 116 in connection with the pretensioning of the mooring line 111.

The winding device 116 preferably comprises at least one elongated member 116, projecting from the buoyant body 101, which provides at least a part of the outer peripheral surface 118. Such a design of the winding device can facilitate the winding of the first line section 112 in turns therearound. It should be appreciated, however, that the elongated member or members do not need to have a circular cross-sectional shape, although it is preferred, but could also have an oval cross-sectional shape or another rounded shape (not shown in the figures). It should also be appreciated that the winding device in other embodiments (not shown in the figures) can comprise several elongated members, which together form the outer peripheral surface.

In a particularly advantageous embodiment, the outer peripheral surface is constituted of a cylindrical envelope surface 118 formed by the winding device 116. It should be appreciated that the cylindrical peripheral surface 118 can be formed by a single cylindrical body of the winding device 116, as is illustrated in FIG. 3, whereas it in other embodiments (not shown in the figures) can be formed by several bodies or members, which together form an at least substantially cylindrical envelope surface.

The winding device can advantageously consist of a shaft 116, a drum, or a pipe having a rounded and preferably circular cross-section and whose one end is welded to a bracket 119 or attachment plate mounted on the buoyant body 101 and whose other, free end projects outwardly in a direction away from the buoyant body 101.

A fastening device comprising a winding device 116 and a securing device 117 interacting therewith, as schematically illustrated in FIG. 3, is very advantageous as compared to several of the previously known fastening devices used on buoyant bodies, such as fixing eyes, shackles, yokes, hawses, fairleads and the like. If a line 112d, 112f is wound around an outer peripheral surface 118 of such a winding device, such as a cylinder-shaped shaft 116, a drum, a pipe, or other rounded body or other rounded assembly, the tensile force in the line will generate a pressure force against the peripheral surface 118, which in its turn may create a friction force against the peripheral surface if there is the slightest slip between the line and the peripheral surface. If, when pretensioning a mooring line of a wave energy converter 100 provided with such a winding device 116 according to the invention, a tensile force Fd is applied on a pulling part 112d of the line by towing or pushing the buoyant body 101 in a direction away from an anchoring point P1 (see FIG. 1) by means of a boat or a vessel, the line will slide along the outer peripheral surface 118 of the winding device 116 and trigger the friction force. The friction force will transfer the tensile force Fd of the line to the outer peripheral surface 118 according to Eytelwein's equation, i.e. $F2 = F1 * e^{(\mu * \alpha)}$, where $\mu$ is the friction coefficient and $\alpha$ is the winding angle. With a friction coefficient of 0.3 between the line 112d, 112f and the outer peripheral surface 118 and the line wound one turn around it, this results in F2=6.6*F1. This means that the line slides along the peripheral surface 118 until the force in the free part Ff is equal to the tensile force Fd divided by 6.6. If the line, on the other hand, is wound two turns V1, V2 around the peripheral surface, the force in the free part Ff instead becomes Fd/43. In a case where Fd is 50 tons, the force in the free part Ff will thus be only 1.16 tons. The strain in the line declines gradually as the tensile force Fd is transferred to the outer peripheral surface 118 of the winding device 116. When towing or pushing of the buoyant body 101 with the boat or vessel stops and the buoyant body 101 sways back in a direction toward the anchoring point P1, the tensile force Fd decreases to about 1.15 tons and the strain in the line is decreased so that the friction force is triggered in the other direction. Now the relationship according to Eytelwein's equation will work in the other direction so that the force in the line increases around the outer peripheral surface 118 of the winding device until it encounters the same tensile force in the line from the other direction. Due to the symmetry in the case in question, this will occur after one turn of line around the outer peripheral surface 118, which means that the second turn of line around the peripheral surface 118 will not be affected at all. During normal operation of the wave energy converter 100 provided with such a winding device 118, the tensile force Fd in the pretensioned mooring line will fluctuate a few hundred Newton around 2 tons, which corresponds to the pretensioning force in a normal case. Therefore, the strain variations of the line wound around the peripheral surface 118 will be very small and only reach a small distance around the peripheral surface 118, which means that the wear and tear due to slipping of the line V1, V2 in contact with the peripheral surface 118 will be minimal. For a longer period of wave energy converter operation, the friction coefficient should be calculated as zero, since the average load on the mooring line, i.e. the pretensioning force, in such a case slowly will be transferred to the free part 112f. In case of a subsequent maximum load event, the friction force will only be triggered for 1.5 turns, after which 2 tons has been reached.

By means of providing the wave energy converter according to the invention with at least one winding device 116 around whose outer peripheral surface 118 the line is wound at least two turns V1, V2, the force Ff in the free part 112 will, at most, amount to a few tons, which means that the securing device 117 can be made simpler, smaller and lighter and be manufactured at a lower cost than what otherwise would be possible. The securing device can for example be designed as a clamping device or line clamp (not shown in the figures) which enables an easy and quick securing and release of the line, or be designed as one or several bollards 120, 121 around which the line is made fast using a suitable knot which is releasable also after high strain, e.g. a bowline hitch or a double half hitch around itself, wherein the free part in the knot can advantageously be seized.

In one embodiment, illustrated in FIG. 3, the securing device 117 comprises at least one bollard 120, 121 or a clamping device for securing the free part 112f of the first line section by means of a knot or a seized eye of the free part 112f around the bollard/bollards, or by clamping the free part in the clamping device.

The winding device 116 of the wave energy converter in the alternative embodiment is preferably adapted to allow the main part of a tensile force Fd exerted on a pulling part 112d of the first line section of a mooring line stretched above the mean force, e.g. by a large wave or when pretensioning the mooring line by means of a boat or vessel, to be absorbed by the outer peripheral surface 118 of the winding device and be reduced to a force Ff in the free part 112f made fast to the securing device 117 which amounts to less than a tenth of the tensile force Fd exerted on the pulling part 112d.

A desired pretensioning of the mooring lines can be accomplished in many different ways. In a case with two mooring lines, as is shown in FIG. 1, the first anchor 114 can, for instance, be laid out first at a first anchoring position P1 by means of a suitable first boat or a smaller vessel. After attaching the first line section 112 to the fastening device 110 on the buoyant body 101, the body can be towed or pushed in a direction away from the first anchoring position P1 by means of the ship or vessel until a desired pretension is achieved in the first mooring line 111. While the first boat or vessel maintains the desired pretension in the first mooring line 111, the second mooring line 111', wound onto and made fast to the second fastening device 110' on the buoyant body 101, can then be laid out in a direction away from the first anchoring position P1 by means of second boat, from which the second anchor finally is laid out at a second anchoring position P2 at a suitable distance from the first anchoring position P1, whereupon the two boats and/or vessels are ready with the pretensioning operation. In a case with three or even more mooring lines and anchors (not shown in the figures), a desired pretensioning of the mooring lines can be accomplished in a similar way, but also many other pretensioning methods are conceivable within the scope of the invention, for example methods involving the use of a remotely operated vehicle (ROV).

The winding device 116 in the alternative embodiment is preferably also adapted to allow variations in the tensile force Fd exerted by a pretensioned mooring line 111 on a pulling part 112d of the first line section during operation of the wave energy converter 100 to be absorbed by the outer peripheral surface 118 along one and a half turn, or fewer, of the at least two turns V1, V2 of the first line section wound around it, so that at least half a turn wound around the outer peripheral surface 118 remains unaffected by the variations in tensile force Fd.

In the previously known fastening devices on buoyant bodies of the type in question, the line usually passes through a hawse or similar element where the line direction changes some distance from the point of attachment of the line to the buoyant body, which results in that the line portion between the point of attachment and the hawse will change length when the load on the line changes and the line will slip against the hawse, where the contact force is high, and be seriously worn. By providing fastening devices comprising a winch 110 and/or winding device 116 from which the first line section 112 goes straight down into the body of water 104 where the buoyant body is anchored, the wave energy converter according to the invention can eliminate this specific problem.

The second line section 113; 113' of the mooring lines used in the wave energy converter 100 according to the invention may comprise a steel cable, but preferably comprises a rope or a braided rope of a synthetic polymer material.

In order to reduce the risk of corrosion and/or chafing against the anchor 114; 114', or against objects in the water near the anchor, the second line section 113; 113' can, in one advantageous embodiment, also comprise a surrounding layer of material or a surrounding coating of a corrosion or wear protection material, which may be any suitable type of material in solid, vaporized, plasma or liquid form that provides such protective properties and can be applied onto the second line section, either during the manufacture or in connection with the mounting or laying thereof.

The at least two anchors 114; 114' to which the buoyant body 101 of the wave energy converter 100 according to the invention is moored can be provided with a fixing eye, a cast-in pipe, or other attachment means (not shown in the figures) adapted to allow the attachment of the second line sections 113; 113' to the respective anchor 114; 114' to be done by passing an end of the respective second line section 113; 113' through the attachment means of the anchor to form a loop around the attachment means and then making a knot, splice or seam to fix the loop and attach the second line section 113; 113' to the anchor 114; 114'.

The at least two anchors 114; 114' to which the buoyant body 101 is moored can particularly advantageously be provided with attachment means (not shown in the figures) adapted to allow the attachment of the second line section 113; 113' to the anchor 114; 114' to be done partially or entirely by means of a remotely operated vehicle (ROV). Such an adaptation of the attachment means may consist in each anchor being provided on its top side with a sturdily mounted attachment means, similar to an over-sized snap hook (not shown in the figures) having a spring-loaded clamp opening into which the remotely operated vehicle (not shown) by means its gripping jaw can push a pre-spliced, tied or sewn loop (not shown) at the end of the second line section 113; 113' whereupon the spring loading can return the clamp opening to the closed condition so that the loop of the second line section 113; 113' is attached to the anchor 114; 114' via the closed clamp.

One problem with the previously used mooring systems is that their fastening devices on the buoyant body and any connecting means between different line sections usually comprise a plurality of metal members being provided with a corrosion protection layer, but that this corrosion protection layer is damaged as time passes when interconnected metal members chafe against each other and/or against a mooring line as the buoyant body is thrown about by wave movements, so that the oxygen-rich and usually salt-saturated atmosphere and the water in the vicinity of the buoyant body can cause corrosion attacks on the metal members, which results in an increased need for maintenance work for replacing metal members, and, in the worst case, can lead to material failure of the metal members and risk of damage to, or loss, of the wave energy converter. Therefore, to reduce the risk of such corrosion problems occurring in the wave energy converter according to the invention, each fastening device on the usually water-, oxygen- and salt-exposed buoyant body preferably comprises a winch or winding device allowing a slip-free and thereby almost abrasion-free attachment of the first line section to the buoyant body, which reduces the risk of corrosion attacks as a result of wear on any metal members.

In another advantageous embodiment of the wave energy converter 100 according to the invention, one or several electrical power transmission cables (not shown in the figures) is/are adapted to extend along one of the mooring lines 111; 111' in a longitudinally extensible manner from the buoyant body 101 to a cable deflection point (not shown in the figures) located at or below the buoyant element 115; 115'. The electrical cable (or cables) can be arranged in loops or in a helix shape so as to be able to extend and retract when the wave energy converter 100 operates and can be held attached to the mooring line by means of loosely fitting, encircling rubber straps or other suitable means (not shown in the figures). Thanks to the fact that the electrical cable (or cables) smoothly follows/follow the movements of the buoyant body 101 and the upper portion of the mooring line 111 in the body of water exposed to wave movement near the water surface, the risk of wear and tear and damages to the electrical cable (or cables) is minimized. After the deflection point below the buoyant element 115; 115', which is located in a relatively calm body of water, the electrical cable (or cables) may extend further laterally to a connecting point of another unit (not shown in the figures) located either at the bottom, below the water surface, above the water surface, or on land.

In the foregoing, the present invention has been described with the aid of a number of different embodiments and with reference to the accompanying drawings. It should be understood, however, that the invention is not limited to the described embodiments and to what is shown in drawings, but that also other embodiments are conceivable within the scope of the invention as it is defined by the following claims.

The invention claimed is:

1. A wave energy converter, comprising:
a buoyant body;
an acceleration tube dependent from and attached to the buoyant body and having an upper end adjacent to the buoyant body and a lower end at a distance from the buoyant body, a portion of the acceleration tube defining a working cylinder between the upper end and the lower end;
upper and lower openings in the acceleration tube to allow a substantially unimpeded flow of water between the working cylinder and a body of water in which the acceleration tube is at least partially submerged when the wave energy converter operates as a result of wave movements;
a working piston reciprocable in the working cylinder;
an energy conversion assembly comprising at least one energy collecting device collecting energy from the movements of the working piston relative to the buoyant body resulting from said wave movements; and
a mooring system configured to maintain the wave energy converter within a desired anchoring area and comprising at least a first fastening device mounted on the buoyant body for attachment of a first mooring line to the buoyant body and at least a second fastening device mounted on the buoyant body for attachment of a second mooring line to the buoyant body,
wherein the first mooring line comprises a first line section for attachment to the first fastening device, and a second line section for attachment to a first anchor placed or configured to be placed at a first anchor position located outside a first side of the desired anchoring area,
wherein the second mooring line comprises a first line section for attachment to the second fastening device, and a second line section for attachment to a second anchor placed or configured to be placed at a second anchor position located outside a second side of the desired anchoring area,
wherein at least one of the mooring lines comprises at least one buoyant element attached between the first line section and the second line section so as to, after positioning of said anchors, attachment of said second line sections to said anchors, pretensioning of each mooring line provided with a buoyant element and attachment of said first line sections to the buoyant body, allow that each mooring line provided with a buoyant element, as a result of inherent buoyancy of said buoyant element, exhibits an angle dependent on said pretensioning between said first line section and said second line section, which enables each mooring line provided with a buoyant element to be kept taut by decrease of the angle and resulting lengthening of the effective length of the mooring line and by increase of the angle and resulting shortening of the effective length of the mooring line, respectively, when the wave energy converter operates as a result of said wave movements, the pretensioning being dependent on the length of the mooring lines and the buoyancy of the buoyant element, and
the lengths of the first and second line sections, respectively, and the buoyancy of the buoyant element of each mooring line, and the pretensioning of the respective mooring lines ensure that each buoyant element is located under the water surface at mean water level.

2. The wave energy converter according to claim 1, wherein the first line section of at least one of the mooring lines has an elastic stretch permitting a maximum lengthening thereof of no more than 5% at maximum calculated force in the mooring line, and said buoyant element between the first line section and the second line section has a position on the mooring line and a buoyancy which, after positioning of said anchor, attachment of said second line section to said anchor, pretensioning of said mooring line and attachment of said first line section to the buoyant body, allow a maximum lengthening and shortening, respectively, of the effective length of the mooring line of at least 30 meters, as a result of said wave movements together with tide variations, other variations in water level, and wind and current drift of the buoyant body.

3. The wave energy converter according to claim 1, wherein at least one of the fastening devices mounted on the buoyant body comprises a winch configured to wind up a portion of the first line section when pretensioning the mooring line and to attach the first line section to the buoyant body.

4. The wave energy converter according to claim 1, wherein at least one of the fastening devices mounted on the buoyant body comprises a winding device, which is rotationally fixedly mounted on the buoyant body, and a securing device, which is disposed on the buoyant body for interaction with the winding device,
  wherein the winding device exhibits an outer peripheral surface, which is configured to wind therearound at least two turns of the first line section, and
  wherein the securing device is configured to secure thereto a free part of the first line section coming from the winding device in connection with the pretensioning of the mooring line.

5. The wave energy converter according to claim 4, wherein the winding device comprises at least one elongated member, projecting from the buoyant body, which provides at least a part of the outer peripheral surface.

6. The wave energy converter according to claim 1, wherein at least a portion of the first line section, located above or near the water surface when the wave energy converter operates, comprises a surrounding layer of material or a surrounding coating of a UV protective material.

7. The wave energy converter according to claim 1, wherein said buoyant element comprises a hollow or porous body and an enclosing casing.

8. The wave energy converter according to claim 1, wherein said buoyant element comprises a plastic material, a natural or synthetic rubber material, a foam material and/or a polymer material with substantially closed cells, and said buoyant element contains air or another gas.

9. The wave energy converter according to claim 1, wherein said buoyant element is attached to a line portion between a first end and an opposite second end of a continuous line in order to form the first line section and the second line section.

10. The wave energy converter according to claim 1, wherein one or more electrical power transmission cables is configured to extend along one of the mooring lines in a longitudinally extensible manner from the buoyant body to a cable deflection point located at or below the buoyant element.

11. The wave energy converter according to claim 2, wherein at least one of the fastening devices mounted on the buoyant body comprises a winch configured to wind up a portion of the first line section when pretensioning the mooring line and to attach the first line section to the buoyant body.

12. The wave energy converter according to claim 2, wherein at least one of the fastening devices mounted on the buoyant body comprises a winding device, which is rotationally fixedly mounted on the buoyant body, and a securing device, which is disposed on the buoyant body for interaction with the winding device,
  wherein the winding device exhibits an outer peripheral surface, which is configured to wind therearound at least two turns of the first line section, and
  wherein the securing device is configured to secure thereto a free part of the first line section coming from the winding device in connection with the pretensioning of the mooring line.

13. The wave energy converter according to claim 3, wherein at least one of the fastening devices mounted on the buoyant body comprises a winding device, which is rotationally fixedly mounted on the buoyant body, and a securing device, which is disposed on the buoyant body for interaction with the winding device,
  wherein the winding device exhibits an outer peripheral surface, which is configured to wind therearound at least two turns of the first line section, and
  wherein the securing device is configured to secure thereto a free part of the first line section coming from the winding device in connection with the pretensioning of the mooring line.

14. The wave energy converter according to claim 2, wherein at least a portion of the first line section, located above or near the water surface when the wave energy converter operates, comprises a surrounding layer of material or a surrounding coating of a UV protective material.

15. The wave energy converter according to claim 3, wherein at least a portion of the first line section, located above or near the water surface when the wave energy converter operates, comprises a surrounding layer of material or a surrounding coating of a UV protective material.

16. The wave energy converter according to claim 4, wherein at least a portion of the first line section, located above or near the water surface when the wave energy converter operates, comprises a surrounding layer of material or a surrounding coating of a UV protective material.

17. The wave energy converter according to claim 5, wherein at least a portion of the first line section, located above or near the water surface when the wave energy converter operates, comprises a surrounding layer of material or a surrounding coating of a UV protective material.

18. The wave energy converter according to claim 2, wherein said buoyant element comprises a hollow or porous body and an enclosing casing.

19. The wave energy converter according to claim 3, wherein said buoyant element comprises a hollow or porous body and an enclosing casing.

20. A wave energy converter, comprising:
  a buoyant body;
  an acceleration tube dependent from and attached to the buoyant body and having an upper end adjacent to the buoyant body and a lower end at a distance from the buoyant body, a portion of the acceleration tube defining a working cylinder between the upper end and the lower end;
  upper and lower openings in the acceleration tube to allow a substantially unimpeded flow of water between the working cylinder and a body of water in which the acceleration tube is at least partially submerged when the wave energy converter operates as a result of wave movements;
  a working piston reciprocable in the working cylinder;
  an energy conversion assembly comprising at least one energy collecting device collecting energy from the movements of the working piston relative to the buoyant body resulting from said wave movements; and
  a mooring system configured to maintain the wave energy converter within a desired anchoring area and comprising at least a first fastening device mounted on the buoyant body for attachment of a first mooring line to the buoyant body and at least a second fastening device mounted on the buoyant body for attachment of a second mooring line to the buoyant body, wherein the first mooring line comprises a first line section for attachment to the first fastening device, and a second line section for attachment to a first anchor placed or configured to be placed at a first anchor position located outside a first side of the desired anchoring area, wherein the second mooring line comprises a first line section for attachment to the second fastening device, and a second line section for attachment to a second anchor placed or configured to be placed at a second anchor position located outside a second side of the desired anchoring area, wherein at least one of the mooring lines comprises at least one buoyant element attached between the first line section and the second line section so as to, after positioning of said anchors, attachment of said second line sections to said anchors, pretensioning of each mooring line provided with a buoyant element and attachment of said first line sections to the buoyant body, allow that each mooring line provided with a buoyant element, as a result of inherent buoyancy of said buoyant element, exhibits an angle dependent on said pretensioning between said first line section and said second line section, which enables each mooring line provided with a buoyant element to be kept taut by decrease of the angle and resulting lengthening of the effective length of the mooring line and by increase of the angle and resulting shortening of the effective length of the mooring line, respectively, when the wave energy converter operates as a result of said wave movements, the lengths of the first and second line sections, respectively, and the buoyancy of the buoyant element of each mooring line, and the pretensioning of the respective mooring lines ensure that each buoyant element is located under the water surface at mean water level, and the first line section of at least one of the mooring lines has an elastic stretch permitting a maximum lengthening thereof of no more than 5% at maximum calculated force in the mooring line.

* * * * *